United States Patent [19]  
Miller et al.

[11] 4,113,674  
[45] Sep. 12, 1978

[54] POLY-2-ALKYL-2-OXAZOLINE MODIFIED REGENERATED CELLULOSICS

[75] Inventors: Stephen L. Miller; Yancey J. Dickert, both of Midland, Mich.

[73] Assignee: The Dow Chemical Company, Midland, Mich.

[21] Appl. No.: 754,730

[22] Filed: Dec. 27, 1976

[51] Int. Cl.$^2$ .............................................. C08L 1/24
[52] U.S. Cl. ............................................ 260/9; 8/31; 8/74; 8/85 R; 8/100 A; 8/65; 264/176 R; 264/184; 264/188; 264/191; 264/194
[58] Field of Search ................................................ 260/9

[56] References Cited

U.S. PATENT DOCUMENTS

| | | | |
|---|---|---|---|
| 3,305,377 | 2/1967 | Mahomed | 264/194 |
| 3,377,412 | 4/1968 | Franks | 264/194 |

OTHER PUBLICATIONS

Chem. Absts., 73:4844h, "Dyeing with Sulfur-Containing Dyes", Cassella Farbwerke Mainkur A.G.
Chem. Absts. 80:134781r, "Dyeing Cellulose Fibers," Shimano.

Primary Examiner—Edward M. Woodberry
Attorney, Agent, or Firm—G. R. Plotecher; J. P. Hill

[57] ABSTRACT

Modified, regenerated cellulosics having good receptivity to acid dyes are prepared by introducing a poly-2-alkyl-2-oxazoline, such as poly-2-ethyl-2-oxazoline, having a weight average molecular weight of at least about 10,000 into an aged, cellulose-xanthate solution and forming modified, regenerated cellulosics therefrom. These cellulosics exhibit rapid and quantitative acid-dye absorption and good dye fastness.

17 Claims, No Drawings

POLY-2-ALKYL-2-OXAZOLINE MODIFIED REGENERATED CELLULOSICS

BACKGROUND OF THE INVENTION

Poly-2-alkyl-2-oxazolines (I) are known compounds and are readily prepared by the ring opening polymerization of substituted oxazolines (II).

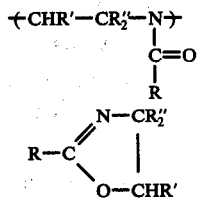

The substituents are hereinafter defined. This polymerization is typically conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride, and organic diazonium fluoroborates, dialkyl sulfates, and other such known catalysts. The reaction is further described by Tomalia et al., J. Polymer Science 4, 2253 (b 1966); Bassini et al., Polymer Letters 5, 871 (1967); and Seeliger, German Pat. No. 1,206,585. Jones et al., U.S. Pat. No. 3,640,909 teach the use of poly-2-alkyl-2-oxazolines as flocculants and as additives in the manufacture of paper.

Known acid-dye receptors for regenerated, cellulosics include polyvinylpyrrolidone, tertiary amines, and quaternary ammonium salts. However, such compounds are chemically and structurally dissimilar to the poly-2-alkyl-2-oxazolines here used.

SUMMARY OF THE INVENTION

According to this invention, poly-2-alkyl-2-oxazolines have been found to be surprisingly effective acid-dye receptors. Modified, regenerated cellulosics comprising regenerated cellulose and at least one weight percent of a poly-2-alkyl-2-oxazoline having a weight average molecular weight of at least about 10,000 exhibit rapid and quantitative acid-dye absorption and good dye fastness. Moreover, poly-2-alkyl-2-oxazolines readily mixes with aged, cellulose-xanthate solutions and are readily incorporated into the formed cellulosic as an integral part thereof.

DETAILED DESCRIPTION OF THE INVENTION

The poly-2-alkyl-2-oxazolines here used are polymers whose backbone molecular structure consists essentially of repeating units of the formula

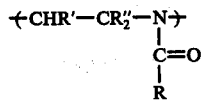

wherein R is an alkyl or inertly-substituted alkyl radical of 1–6 carbon atoms and R' and each R" are individually hydrogen or an alkyl or an inertly-substituted alkyl radical of 1–4 carbon atoms. By "inertly-substituted" is meant that the substituent does not adversely affect the dye receptivity properties of the polymer. Typical inert substituents include halogen, ester, ethylenic unsaturation, hydroxyl, and the like. R is preferably an alkyl radical of 1–4 carbon atoms and most preferably an alkyl radical of 1 or 2 carbon atoms. R' is preferably hydrogen and each R" is preferably hydrogen or an alkyl radical of 1 or 2 carbon atoms and is most preferably hydrogen. Poly-2-ethyl-2-oxazoline is most preferred.

A poly-2-alkyl-2-oxazoline having a weight average molecular weight of at least about 10,000, as determined by gel permeation chromatography (using polystyrene as the standard), is typically required for the practice of this invention. Polymers of lesser molecular weight are generally too easily leached from the cellulosic to permit their practical use. Preferably, the polymers have a minimum molecular weight of about 50,000. Practical considerations, such as solubility in water, viscosity, economics, and the like, are the only limitations upon the polymers' maximum molecular weight. The preferred maximum molecular weight is about 500,000, with the most preferred about 350,000.

Modified, regenerated cellulosics are generally prepared by introducing or mixing an aqueous poly-2-alkyl-2-oxazoline solution into an aged, cellulose-xanthate solution, and preferably blending the two solutions such that the resulting solution is a homogeneous mixture, prior to cellulosic formation. By the terms "cellulosic formation", "forming cellulosics", and the like, is meant those steps, such as extruding, gathering, winding, etc., by which a cellulosic composition is formed into regenerated fibers and fiber products, such as yarn, carpet tufts, etc. The aqueous poly-2-alkyl-2-oxazoline solution generally contains at least about 10 weight percent of the polymer, and preferably about 20 weight percent, with no weight percent maximum other than those imposed by practical considerations. Sufficient poly-2-alkyl-2-oxazoline is introduced into the cellulose-xanthate solution such that the resulting solution contains at least about one weight poly-2-alkyl-2-oxazoline based on cellulose in viscose (CIV), and preferably at least about 2.5 weight percent CIV. Cellulosics formed from the resulting solution thus comprise at least one weight percent poly-2-alkyl-2-oxazoline and preferably at least about 2.5 weight percent. Introduction of poly-2-alkyl-2-oxazoline in excess of about 4 weight percent CIV into the aged, cellulose-xanthate solution, while readily feasible, is presently economically disfavored.

This invention can be practiced with any suitable cellulosic composition. Man-made, viscose compositions, such as rayon, acetate, triacetate and the like, are typical.

Cellulosic-forming procedures and equipment are not critical to this invention and can be varied as desired.

The modified, regenerated cellulosics of this invention rapidly and quantitatively absorb and hold fast most known and commercially available acid dyes. Illustrative dyes include: Cibalan ® and Lanacron ®, each a series of metal-complex dyes manufactured by CIBA Chemical and Dye Company; Vialon ® and Ortolan ®, each a series of dyes manufactured by BASF Corporation; and the like. Of course, the particular dyeing results achieved are dependent upon numerous factors, such as type and amount of dye receptor, cellulose solution, type and amount of dye, etc.

The following examples are illustrative of certain specific embodiments of this invention. Unless indicated to the contrary, all parts and percentages are by weight.

SPECIFIC EMBODIMENTS

Example 1

Three viscose rayon samples were prepared. The first sample was without a modifier (dye receptor). The second sample contained as a modifier 2.5 percent poly-2-ethyl-2-oxazoline (PEO), 92,000 molecular weight. The third sample contained as a modifier 2.5 percent PEO, 325,000 molecular weight. The PEO-modified samples were prepared by introducing a 20 weight percent aqueous solution of the modifier into a cellulose-xanthate solution and forming 720-filament, 1100 denier yarn therefrom.

An 6-foot length of each sample was placed in a 250-ml glass beaker and dried at 70° C. for 6 hours in a constant-temperature oven. The samples were adjusted so that their weights were within 3.6 mg of each other and then wound around a 3-inch (O.D.) 10-mesh stainless steel screen cylinder with uniform tension being achieved throughout winding. The screen-bound samples were then immersed in a 3-liter beaker containing a prepared dye bath at ambient temperature. The prepared dye bath comprised Irgalan Blue FBL ®, a dye manufactured by CIBA Chemical and Dye Company (0.1 g), Alkanol ND ® (0.575 g), a nonionic surface-active agent of a fatty alcohol-ethylene oxide condensation product manufactured by E. I. du Pont de Nemours and Company, and trisodium phosphate12 $H_2O$ (3.306 g) diluted to 2300 ml volume with deionized water.

The dye bath was continuously agitated and was ambient temperature at the instant of immersion and then gradually heated to boiling over a 40–45 minute period and then maintained thereat for 1 hour. The screen-bound fibers were subsequently removed and soaked in deionized water for 30 minutes.

The dyed and washed fibers were then contacted with two 20-ml portions from a 40-ml mixture of dimethylformamide (30 ml) and deionized water (10 ml) to extract the dye therefrom. The dye extracts were then compared to standard dye concentration samples by using a Varian UV-visible spectrophotometer. The results are reported in Table I.

TABLE I

VISCOSE RAYON FIBER DYE RECEPTIVITY OF IRGALAN FBL ®

| Sample | Fiber | Fiber Weight (g) | Equivalent* Dye Uptake (g) |
|---|---|---|---|
| 1 | Unmodified Rayon | 0.1290 | 0 |
| 2 | 92,000 M.W. 2.5% PEO Rayon | 0.1254 | $6.20 \times 10^{-4}$ |
| 3 | 325,000 M.W. 2.5% PEO Rayon | 0.1270 | $7.76 \times 10^{-4}$ |

*Computed by converting absorbance to g/l dye concentration and then multiplying by 0.04 (conversion factor for liters to 40 ml).

Example 2

Example 1 was repeated except that a dye bath comprising Vialon Blue FFGL ® (0.1 g), a dye manufactured by BASF Corporation, Alkanol ND ® (0.575 g), and Igepal CO-630 ®, an alkyl phenoxy poly(oxyethylene) ethanol nonionic surfactant manufactured by GAF Corporation, diluted to 2300 ml with deionized water was substituted for the dye bath used in Example 1. The results are reported in Table II.

TABLE II

VISCOSE RAYON FIBER DYE RECEPTIVITY OF VIALON FFGL ®

| Sample | Fiber | Fiber Weight (g) | Equivalent* Dye Uptake (g) |
|---|---|---|---|
| 1 | Unmodified Rayon | 0.1997 | $2.20 \times 10^{-4}$ |
| 2 | 92,000 M.W. 2.5% PEO Rayon | 0.1986 | $1.08 \times 10^{-3}$ |
| 3 | 325,000 M.W. 2.5% PEO Rayon | 0.1978 | $1.14 \times 10^{-3}$ |

*Computed by converting absorbance to g/l dye concentration and then multiplying by 0.04 (conversion factor for liters to 40 ml).

The preceding examples demonstrate that the PEO-modified regenerated cellulosic fibers have superior dye absorption properties than unmodified like fibers.

It is understood that the embodiments of this invention herewith shown and described are preferred examples of same and that various changes can be resorted to without departing from the spirit of the invention or the scope of the adjoining claims.

What is claimed is:

1. A modified, regenerated cellulosic comprising regenerated cellulose and at least one weight percent of a poly-2-alkyl-2-oxazoline having a weight average molecular weight of at least about 10,000, the poly-2-alkyl-2-oxazoline being an integral part of the cellulosic.

2. The cellulosic of claim 1 wherein the poly-2-alkyl-2-oxazoline has a backbone molecular structure comprising repeating units of the formula

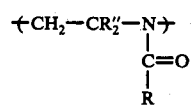

wherein R is an alkyl or an inertly-substituted alkyl radical of 1-6 carbon atoms and each R" is hydrogen or an alkyl or an inertly-substituted alkyl radical of 1-4 carbon atoms.

3. The cellulosic of claim 2 wherein each R" is hydrogen.

4. The cellulosic of claim 3 wherein R is ethyl.

5. The cellulosic of claim 4 wherein the poly-2-ethyl-2-oxazoline has a weight average molecular weight of between about 50,000 and about 350,000, inclusive.

6. The cellulosic of claim 5 comprised of at least about 2.5 weight percent of the poly-2-ethyl-2-oxazoline.

7. A method of preparing the modified, regenerated cellulosic of claim 1, the method comprising:
 (a) mixing an aqueous solution of a poly-2-alkyl-2-oxazoline having a weight average molecular weight of at least about 10,000 into an aged, cellulose-xanthate solution prior to cellulosic formation, and
 (b) forming modified, regenerated cellulosics therefrom.

8. The method of claim 7 wherein the poly-2-alkyl-2-oxazoline has a weight average molecular weight of between about 50,000 and about 350,000, inclusive.

9. The method of claim 8 wherein the poly-2-alkyl-2-oxazoline has a backbone molecular structure comprising repeating units having the formula

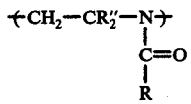

wherein R is an alkyl or an inertly-substituted alkyl radical of 1–6 carbon atoms and each R″ is hydrogen or an alkyl or an inertly-substituted alkyl radical of 1–4 carbon atoms.

10. The method of claim 9 wherein each R″ is hydrogen.

11. The method of claim 10 wherein R is ethyl.

12. The method of claim 11 wherein the aqueous solution contains at least about 10 weight percent poly-2-ethyl-2-oxazoline.

13. The method of claim 11 wherein the aqueous solution contains at least about 20 weight percent poly-2-ethyl-2-oxazoline.

14. The method of claim 13 wherein sufficient poly-2-ethyl-2-oxazoline is introduced into the aged, cellulose-xanthate solution such that the resulting solution contains at least about one weight percent poly-2-ethyl-2-oxazoline based on cellulose in viscose.

15. The method of claim 13 wherein sufficient poly-2-ethyl-2-oxazoline is introduced into the aged, cellulose-xanthate solution such that the resulting solution contains at least about 2.5 weight percent poly-2-ethyl-2-oxazoline based on cellulose in viscose.

16. The method of claim 15 wherein the aqueous poly-2-ethyl-2-oxazoline solution and the aged, cellulose-xanthate solution are blended such that the resulting solution is a homogeneous mixture.

17. A modified, regenerated cellulosic prepared by a method comprising:
(a) mixing an aqueous solution of at least about 10 weight percent poly-2-alkyl-2-oxazoline having a weight average molecular weight of at least about 10,000 into an aged, cellulose-xanthate solution prior to cellulosic formation, and
(b) forming modified, regenerated cellulosics therefrom.

* * * * *

UNITED STATES PATENT AND TRADEMARK OFFICE
CERTIFICATE OF CORRECTION

PATENT NO. : 4,113,674
DATED : September 12, 1978
INVENTOR(S) : Stephen L. Miller; Yancey J. Dickert It is certified that error appears in the above-identified patent and that said Letters Patent are hereby corrected as shown below:

Column 1, line 29: Delete "b" before 1966 within parenthesis;

Column 3, line 18: "An" should be --A--;

Column 3, line 32: "phosphate 12 $H_2O$" should be --phosphate·12 $H_2O$--.

Signed and Sealed this

Ninth Day of January 1979

[SEAL]

Attest:

RUTH C. MASON
Attesting Officer

DONALD W. BANNER
Commissioner of Patents and Trademarks